United States Patent
Hsieh et al.

(10) Patent No.: US 7,421,104 B2
(45) Date of Patent: Sep. 2, 2008

(54) METHOD OF AUTOMATICALLY ASSESSING SKELETAL AGE OF HAND RADIOGRAPHS

(75) Inventors: Chi-Wen Hsieh, No. 3, Lane 5, Tzu Kuang St., Ta Hsi Chen, Taoyuan Hsien (TW); Tai-Lang Jong, Hsin Chu (TW); Chi-Hsing Chang, Taichung (TW); Chui-Mei Tiu, Taipei (TW)

(73) Assignee: Chi-Wen Hsieh, Taoyuan Hsien (TW)

( * ) Notice: Subject to any disclaimer, the term of this patent is extended or adjusted under 35 U.S.C. 154(b) by 763 days.

(21) Appl. No.: 10/920,264

(22) Filed: Aug. 18, 2004

(65) Prior Publication Data
US 2005/0196031 A1    Sep. 8, 2005

(30) Foreign Application Priority Data
Mar. 3, 2004    (TW) .............................. 93105566 A

(51) Int. Cl.
G06K 9/00    (2006.01)
(52) U.S. Cl. ...................................... 382/132; 382/128
(58) Field of Classification Search ................. 382/128, 382/129, 130, 131, 132
See application file for complete search history.

(56) References Cited

U.S. PATENT DOCUMENTS
2003/0053673 A1* 3/2003 Dewaele ..................... 382/132

* cited by examiner

*Primary Examiner*—Jingge Wu
*Assistant Examiner*—Amara Abdi
(74) *Attorney, Agent, or Firm*—Troxell Law Office, PLLC

(57) ABSTRACT

A method of automatically assessing skeletal age of hand radiographs, comprising: providing a radiographic image of both two hands; cropping a first image of the left hand or the right hand; rotating the first image to make the fingertip of the medius point upwards the vertical; cropping a second image of the medius; segmenting the phalanges of the medius to acquire a third image; extracting a plurality of physiological features of the third image to acquire a first data; extracting a plurality of morphological features of the third image to obtain a second data; delivering the first data and the second data to a neural network for training; and outputting an assessment of the skeletal age.

1 Claim, 3 Drawing Sheets

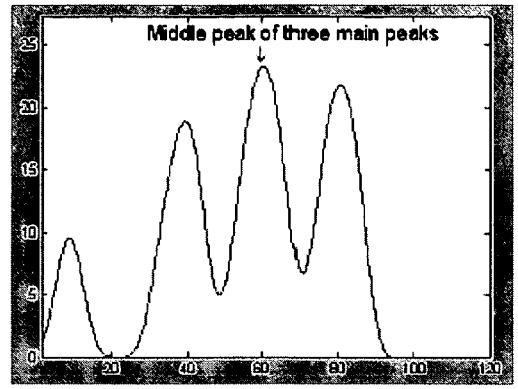

FIG.4

| Correct Rate of Bone Age Assessment of Physiological features ||||
| Sex | Correct rate | BP || SVM |
| | | Mean. | Std. | |
| Female | Errors within 1.5 years | 82.14% | 1.77% | 83.51% |
| Male | Errors within 1.5 years | 81.29% | 1.58% | 82.16% |
| Correct Rate of Bone Age Assessment of DCT coefficients of morphological features ||||
| Sex | Correct rate | BPNN || SVM |
| | | Mean. | Std. | |
| Female | Errors within 1.5 years | 82.47% | 1.40% | 83.15% |
| Male | Errors within 1.5 years | 87.30% | 1.05% | 93.25% |
| Correct Rate of Bone Age Assessment of DWT coefficients of morphological features ||||
| Sex | Correct rate | BP || SVM |
| | | Mean. | Std. | |
| Female | Errors within 1.5 years | 82.45% | 1.33% | 83.37% |
| Male | Errors within 1.5 years | 90.62% | 0.79% | 92.36% |

FIG.5

METHOD OF AUTOMATICALLY ASSESSING SKELETAL AGE OF HAND RADIOGRAPHS

TECHNICAL FIELD OF THE INVENTION

The present invention relates in general to a method of automatically cropping an image of the left hand or the right hand from a radiograph of both two hands. In addition, the present invention relates to a method of automatically finding the medius in a radiographic image of the left hand or the right hand. More specifically, the present invention relates to a method of automatically assessing skeletal age through hand radiographs.

BACKGROUND OF THE INVENTION

The assessment of skeletal age is of great use in pediatric radiology. It is performed in pediatric patients to evaluate their growth disorder, determine their growth potential, and monitor the therapy effects of growth. The disagreement between the skeletal age and the chronological age may indicate abnormalities in skeletal development, such as growth retardation and hormone disorder, etc. Nevertheless, detection of pediatric skeletal growth from standard radiographic studies is subject to large inter- and intra-observer variability. Therefore, it is difficult to depict the ossification process of the hand radiographs during a short time interval and to make an assessment by eyes with qualitative information.

In prior arts, there are two common methods applied for characterizing the skeletal growth and development of hand radiographs. Greulich and Pyle (G&P) method, the most commonly used method, is based on a general comparison with standards of the atlas of hand radiography, but there exists subjective factors resulting in disagreements due to individual medical doctor's experiences. When a radiograph does not completely match atlas standards, a subjective interpretation is performed, or ambiguous results may be achieved by a most analogous pattern. Therefore the measurements often vary from physician to physician. The other commonly used technique is the Tanner and Whitehouse (TW2) method. TW2 method makes detailed analyses of each individual bone and scores points of each bone. Then, a total score can be acquired to assess the skeletal age. TW2 method is acknowledged as more complicated than G&P method and takes much time on judgment, so the rate of the application of TW2 method does not exceed 20%. Except two conventional methods described above, V. Gilsanz et al. also provide a method of assessing bone age with assistance of computer (IEEE TRANSACTIONS ON MEDICAL IMAGING, VOL. 20, NO. 8, AUGUST 2001). However, the computer-assisted bone age assessment is not expatiated herein.

The assessment of skeletal growth is the foundation of the maturity and growth of structural bones. In hand radiographs, the information of wrist and phalanges is used to assess bone age. In wrist, assessment of the growth of carpal bones usually relies on its sizes and characteristic shape. Accordingly, the method of skeletal age assessment based on carpal bone features is to find the numbers of carpal bones and their sizes as well as shapes as features. Unfortunately, some carpal bones may overlap with others as growth proceeds. Because the radiogram is two-dimensional image, the phenomenon of the overlap among carpal bones makes it much more difficult to assess the skeletal age for patients older than 9-12 years of age. In this stage of development, the phalangeal analysis yields more reliable results. The phalangeal analysis which extracts the information of growth and maturity of phalanges is another method to assess skeletal age by virtue of hand radiographs. The growth of an individual phalangeal bone occurs at sites on the periphery of that bone. Each phalangeal bone undergoes stages of maturity as it grows. The first stage is characterized by the formation of a growth plate (or ossification center or epiphysis) of each end of the bone, which appears as cigar shapes in radiographs. The bone lengthens as new bone is added between the ends of the bone and the growth plates during the next growth stage. The growth plates fuse to the bone and growth stops in the final stage. Consequently, the most important information of phalanges is always concealed in the epiphyses.

Most of the bone-age assessment is performed by experienced radiologists or physicians. The correctness of the assessment is heavily dependent upon the persons performing the evaluation. Therefore, it is highly prone to errors caused by human effect, such as inconsistent assessments of the same subject by the same doctor due to different evaluation time or fatigue, inconsistent assessments among different doctors due to variation of their training, experiences, or subjective opinions, etc. A computer-assisted bone age assessment system can generate reproducible and reliable measurements. It can be used to assist radiologists to judge skeletal age more efficiently. Therefore, it is worth developing a reliable computerized bone age assessment system.

SUMMARY OF THE INVENTION

The first object of the present invention is to provide a method of automatically cropping a radiographic image of the left hand or the right hand from a radiograph of both two hands.

The second object of the present invention is to provide a method of automatically finding the medius in a radiographic image of the left hand or the right hand.

The third object of the present invention is to provide a method of automatically assessing skeletal age of hand radiographs.

The present invention discloses a method of automatically assessing skeletal age of hand radiographs. Firstly, a radiographic image of both two hands is provided. Next, a first image of the left hand or the right hand is cropped. The first image is rotated to make the fingertip of the medius point upwards the vertical. A second image of said medius is then cropped from the first image. The phalanges of the medius is segmented, wherein this procedure further comprises: smoothing said second image by using a first filter to generate a third image; detecting the image edge of the third image by using a second filter and a third filter to generate a fourth image; and masking the fourth image to the second image to obtain a phalangeal bone region of interest. Next, pluralities of physiological features of the fourth image are extracted to acquire a first data. In addition, pluralities of morphological features of the fourth image are extracted to obtain a series of parameters, wherein several parameters with high correlation to the skeletal growth are selected to serve as a second data. Then, the first data and the second data are delivered to a neural network for training. Lastly, the assessment of the skeletal age is outputted.

BRIEF DESCRIPTION OF THE DRAWINGS

FIG. 4 shows projection of the scanning scheme according to the present invention.

FIG. 5 shows correct rates of bone age assessments according to the present invention.

DETAILED DESCRIPTION OF THE INVENTION

In the present invention, the left hand is illustrated as a preferred embodiment. It is appreciated that illustrations and descriptions with respect to the left hand will not limit the score and spirit of the invention. That is, all phrases of "left hand" showing below can be replaced with "right hand".

Figure 1:
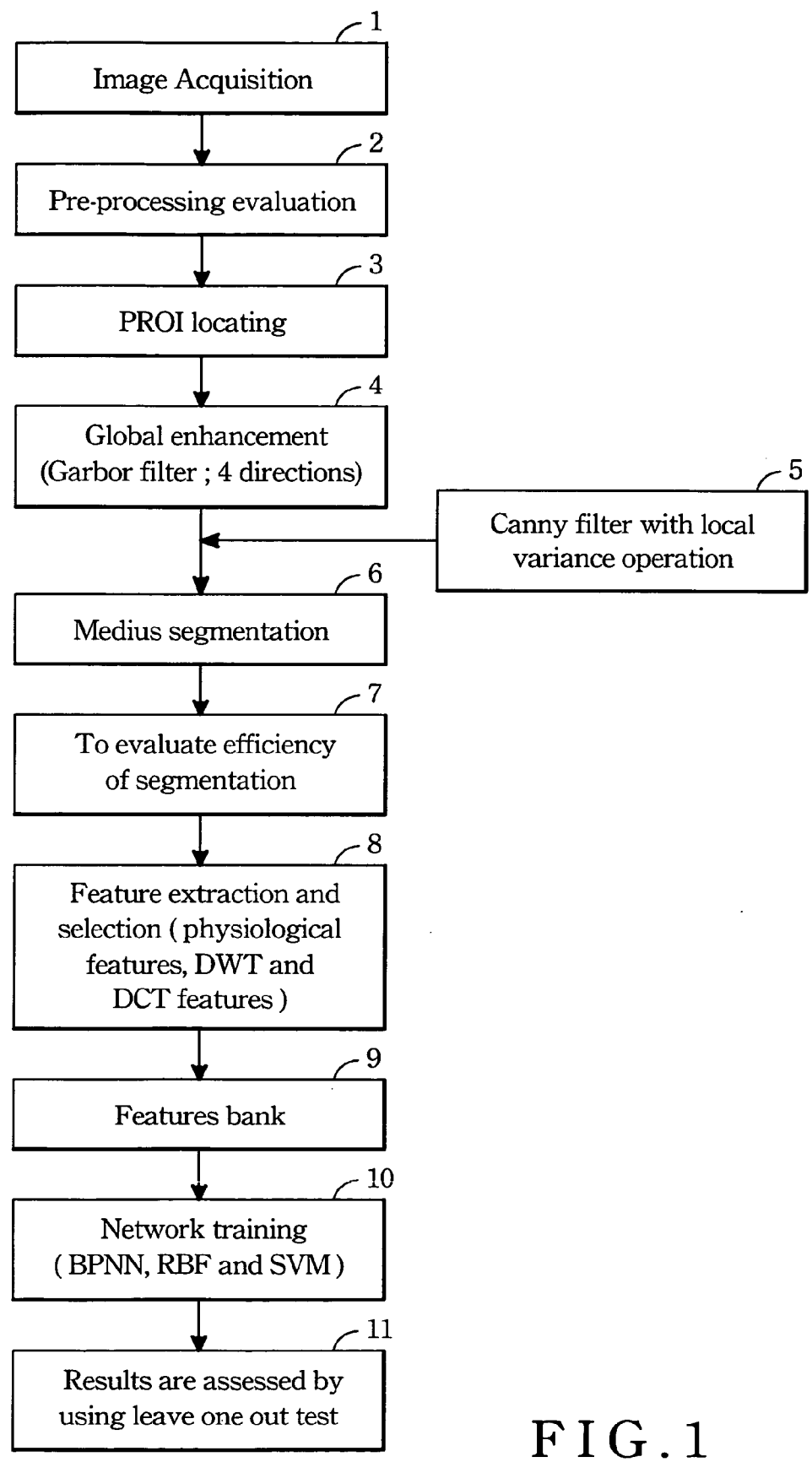
FIG. 1 shows the operations of the present invention.

FIG. 1 shows the operations of the present invention.

I. Crop the Image of the Left Hand

In general, the image containing both two hands is inputted to a computer (operation 1 of FIG. 1). The left and right hand may connect to each other in some images. Therefore, an attempt to crop the left hand simply using a threshold is sometimes failed. In order to estimate the region where the left hand locates correctly, a little more complicated procedure is introduced and described as follows:

1. Read in a hand radiograph.

Figure 2:
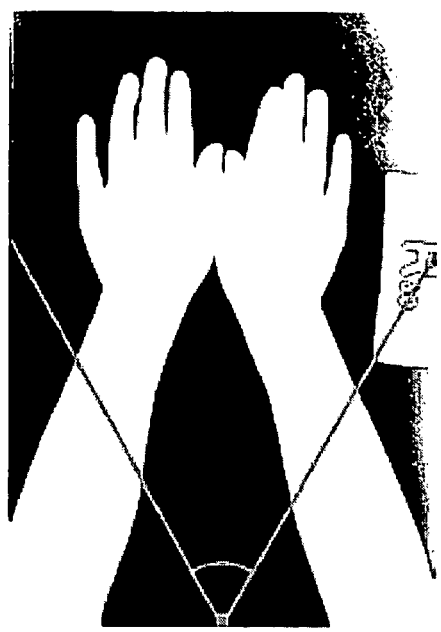
FIG. 2 shows the binary image after thresholding according to the present invention.

2. A suitable threshold obtained from the down-sampling and averaging of the original large-sized hand radiograph is applied to obtain a binary image as shown in FIG. 2. A binary image is an image in which each pixel assumes one of only two discrete values. Essentially, these two values correspond to on and off, and represented by 1's and 0's, respectively. The image after thresholding may retain hands and some unwanted regions. These unwanted regions are always small compared to the region of hands so they will not affect the following steps.

3. Still Refer to FIG. 2. Select the middle point at the bottom of image as reference point and start a scanning scheme. Set the horizontal to 0°. The first scan line is 60° counterclockwise and the last line is 120° counterclockwise. From 60° to 120°, a scan line is added when the angle increases 1°.

Figure 3:
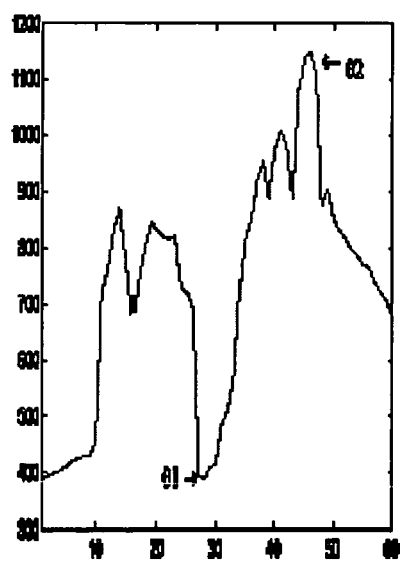
FIG. 3 shows scanning profile of FIG. 1 according to the present invention.

4. Along each scan line, count the number of pixels whose value is 1 and a profile of the scanning scheme is obtained as FIG. 3. Find the minimum among these 61 numbers and record its related angle as $\theta_1$. Along this direction, most of the left hand region could be included. However, to ensure the whole region of the left hand being contained, the procedure continues to the next step.

5. From 60° to $\theta_1$, find the maximum number and its related $\theta_2$ through FIG. 3. Based on $\theta_1$ and $\theta_2$, compute $\theta_3$ with following formula:

$$\theta_3 = (2*\theta_1 + \theta_2)/3$$

Along direction $\theta_3$, record the coordinates of the middle point of this scan line. The vertical line passing through the middle point will serve as the right boundary of the crop image. The $\theta_3$ is selected to ensure that the left hand will be fully covered.

II. Acquiring Phalangeal Bone Region of Interest (PBRI)

After cropping the left hand, it is expected to rotate the image (operation 2 of FIG. 1) to make it easier to find and cut the medius of the left hand. It is noted that the orientation of left hand, the covered range of ulna and radius, and the fusion parts of soft tissues of each finger, all make it difficult to find the phalangeal bone region of interest just using a simple procedure. In order to overcome the drawbacks mentioned herein, an elaborate and effective approach is propounded as follows:

1. Read in the cropped left hand image.

2. Calculate the mean value of the whole image. Use the mean value as a threshold to make an attempt to remove the background pixels. Most of the residues in the image are regions of the left hand, including phalanges, metacarpal bones, carpal bones and parts of ulna and radius.

3. Estimate the coordinates of the center of the residual regions in the previous step. The formula to estimate the center of the residual regions is as follows:

$$\vec{x}_c = \frac{1}{N} \sum_{p \in \text{regions}} \vec{x}(p)$$

where p is a point of the residual regions, $\vec{x}(p)$ represents the coordinates of the point p, N is the total number of the residual regions, and $\vec{x}_c$ is the calculated center of regions. It is expected that the center should fall in the palm, regardless of the disturbance of non-hand regions such as noise and labels used to distinguish between the left hand and right hand by doctors.

4. A comparison is performed to modify the position of center approximately if necessary. The main disturbance of finding the center is the existence of redundant parts of ulna and radius. Therefore, it is requested to find the width along the horizontal passing through the found center and the height from the found center to the bottom of the image. Compute the ratio of the height to the width. If the ratio is greater than 1.5, there is a high probability that the image contains most of ulna and radius so that the image must be cropped in the vertical direction and a new center is found again; otherwise, no more cropping is needed to perform. The cropping height is in proportion to the ratio. If the ratio is higher than the cropping height, it indicates the original image contains larger parts of ulna and radius and hence fewer parts below the center should be reserved.

5. After the center is anchored, a scanning scheme similar to that used to find the left hand is performed. Set the center as a reference point and the angle of horizontal passing through the center 0°. From 0° to 180° counterclockwise, a new scan line is added per 1°. A scan line leaving from the center keeps stretching until the boundary of the region is reached. The distance between the position of the boundary and the center is computed. Among 181 numbers, the maximum number and its related angle are found. The scan line of the angle is assumed to be the roughly estimated direction of the medius.

6. Rotate the image by the angle between vertical and the previous found angle using the nearest neighbor interpolation so that the tip of the medius almost points upwards to the vertical.

7. An arc scanning scheme is then executed. The arc scanning scheme is different from the ones mentioned above. Plot an elliptic arc using the previous found center as reference point and using the maximum number found in the step 5 as radii of long axis (horizontal direction) and short axis (vertical direction) first. From 60° to 120°, search the related pixel per 0.5° and record its gray level into a row vector. Compute the mean of the row vector. If these values of the vector are greater than the mean value, set them to 1; else, set them to 0. Repeat this step and stop it till the differences of radius between the short axis and the long axis is 10-pixel-length. Hence, several row vectors with the same dimension are acquired.

8. Sum all row vectors into a single one. Smooth the resultant row vector and a shape of fingers will be projected (shown in FIG. 4). In a preferred embodiment of the present invention, because the scanning range is limited, the three longest fingers will contribute to three main peaks in the projection. The middle peak among the three main peaks represents the related positions of the medius.

9. Tip of the medius is found out along the direction of the medius. In the present invention, the top point of the direction is determined to be the tip of the medius and set to be a reference point. From the reference point to a point along the direction, several windows are used to frame the medius out. Each window is slid from the left to the right and the mean value of the gray scales within the window every time this window slid is computed. The window eventually locates on the position where the mean value is maximal. Thus, the medius is framed out.

10. Draw a line from the top window and the bottom window obtained from the step 9 and find out the angle between the line and the vertical. Then, the image is rotated by the angle so that the tip of the medius points upwards to the vertical. Lastly, PBRI of the medius is extracted (operation 3 of FIG. 1).

III. Segmentation of Phalangeal Bone Region of Interest

The goal of the stage is to segment the phalanges from the neighboring unwanted background noise and surrounding soft tissue pixels, so that the phalangeal analysis is possible. A smoothing procedure is executed first so that most of the noise in the image will be reduced. Second, two edge detectors, Canny and local variance, are use to find the edges of the phalangeal image and growth plates between phalanges.

The goal of the stage is to segment the phalanges so that the phalangeal analysis is practical. The smoothing procedure is executed first so that most noise of the image will be degraded.

Several different filters such as mean filter, median filter, Gaussian filter and Gabor filter are selective to acquire acceptable smoothing results. In a preferred embodiment of the present invention, Gabor filter is selected to execute smoothing procedure among these filters. The even-symmetric Gabor filter has the general form $$h(x, y; \phi, f) = \exp\left\{-\frac{1}{2}\left[\frac{x_\phi^2}{\delta_x^2} + \frac{y_\phi^2}{\delta_y^2}\right]\right\}\cos(2\pi f x_\phi)$$

$$x_\phi = x\cos\phi + y\sin\phi$$

$$y_\phi = -x\sin\phi + y\cos\phi$$

where $\phi$ is the orientation of the Gabor filter, f is the frequency of a sinusoidal plane wave, and $\delta_x$ and $\delta_y$ are the space constants of the Gaussian envelope along x and y axes, respectively. The effect of Gabor filter is similar to that of Gaussian filter because Gabor filter is enveloped by Gaussian filter. Nevertheless, there are differences between them. Gabor filter has an orientation parameter and a frequency parameter that they can be controlled to reduce the degree of smoothing in the specified orientation. This is an advantage of Gabor filter and thus why it is selected to perform smoothing.

After smoothing procedure is executed, edge detecting is performed. There are many edge detectors implemented in digital images and Canny edge detector is adapted in a preferred embodiment of the invention. Usually, there are many spurious responses in the edge detecting images. In order to reduce most of these responses, two different thresholds are set in the Canny edge detector for distinguishing the spurious responses from weak edge responses.

Except Canny edge detector, local variance method is also used to find edges. A local variance is the variance of a pixel and its neighborhood. Select a window that would define the neighborhood of a pixel, compute the variance with the statistic formula, and then substitute the new value for the original brightness of that pixel so that a new image can be acquired. The advantage of local variance method is to transform some weak edges to strong ones and thus it is useful to find edges of an object completely.

Using the above-mentioned methods, a complete procedure is presented to segment the phalanges. The procedure is listed as follows:

1. Four different oriented Gabor filters (0°, 45°, 90°, 135°) are used to smooth the original image, respectively (operation 4 of FIG. 1).
2. Use the Canny edge detector to find edges of previous four smoothing images respectively and then combine the four edges images into a single one.
3. Repair the epiphyses within joints by using local variance edge detector and fill the regions new edges circumscribing. Select these regions which the main axis passes through (operation 5 of FIG. 1).
4. Use the region image to mask the original image. Find the position of the joint between medius and the metacarpal bone and cut the metacarpal bone off (operation 6 of FIG. 1). In the present invention, the correct rate of medius image extraction is greater than 99% (operation 7 of FIG. 1).

VI. Feature Extraction

To reduce the computation burden and sometimes improve the rate of correct classification, some features, instead of the segmented phalangeal image itself, are extracted from a segmented image before a corresponding bone age assessment is made. In a preferred embodiment of the invention, two categories of feature sets are extracted automatically to meet the demand, namely, the physiological and morphological phalangeal features (operation 8 of FIG. 1).

1. Physiological Features

The physiological features are extracted from the segmented images first. The physiological features include the lengths, widths, and areas of distal, middle, and proximal phalanges, respectively. In order to extract physiological features from the three phalanges respectively, the positions of joints must be located. There is prior knowledge about the positions of joints that when the phalanges is segmented into 3/10, 3/10, and 4/10 parts from tip of distal to bottom of proximal phalanges along the vertical axis, the knuckles will be contained in first two segmented parts. Images in three parts are projected to the Y axis, i.e. the vertical where the tip of the medius points to, to acquire a profile. Find out the minimum along the profile and set it to the position of the knuckle. After the positions of joints are found, the physiological features are extracted. In one preferred embodiment of the present invention, lengths of vertical axes and horizontal axes in three parts and areas of three phalangeal images are extracted to serve as physiological features. In addition, the length of medius is also determined as a physiological feature and totally 10 physiological features are available. It is appreciated that the 10 physiological features illustrated herein are not used to limit the scope and spirit of the present invention.

2. Morphological Features

Except these 10 features, doctors always pay more attentions to the developments of epiphyses. They measure widths and lengths of epiphyses, and gaps between epiphyses and metaphyses or diaphyses by various complicated image processing methods.

The features of the descriptions may lead to good results of bone age assessments, but the shortcoming is that the dimension is high. A high dimension implies that it needs more computing time to train the assessment system. In one preferred embodiment of the present invention, the discrete cosine transform (DCT) and discrete wavelet transform are employed to extract morphological features and transform the profile for data compression. Accordingly, the discrete cosine transform (DCT) and discrete wavelet transform are applied to extract 10 frequency components with much significance serving as morphological features.

V. RESULTS AND CONCLUSION

Radiographs of pediatric metacarpal bone obtained from database of Taipei Veterans General Hospital, Taiwan, are used to investigate the correct rate of the assessment of skeletal age. From December of 1998 to January of 2004, accumulated radiographs are more than three thousand sheets and the age distribution thereamong is ranging from newborn infants to 18 years old (operation 9 of FIG. 1). Results show that the correct rate of medius image extraction is greater than 99%. Then, back propagation neural network (BPNN), radial basis function of neural network (RBF) and support vector machine of neural network (SVM) are used for assessing skeletal age based on phalangeal features extracted from hand radiographs (operation 10 of FIG. 1). In a preferred embodiment, BPNN is adapted to train the data of features. In simulation, the dimension of input layer is ten. The only hidden layer has 10 neurons, and an output layer has 18 neurons. The outputting results are assessed by using leave one out algorithm (operation 11 of FIG. 1). Referring to FIG. 5, correct rates of assessment are greater than 80%. In addition, results also reveals that DCT is indeed useful to the assessment of the skeletal age and the corresponding correct rate thereof is a little higher than that of physiological features.

Although the preferred embodiment of this invention has been disclosed for illustrative purpose, those skilled in the art will appreciate that various modifications, additions and substitutions are possible, without departing from the scope and spirit of the invention as described in the accompanying claims.

What is claimed is:

1. A method of automatically assessing skeletal age of hand radiographs, comprising:
    reading in a radiographic image of both two hands;
    cropping a first image of the left hand or the right hand from said radiographic image;
    rotating said first image to make the fingertip of the medius point upwards the vertical;
    cropping a second image of said medius from said first image;
    segmenting the phalanges of said medius, comprising
        smoothing said second image by using a first filter to generate a third image;
        detecting the edge of said third image by using a second filter and a third filter to generate a fourth image;
        masking said fourth image to said second image to obtain a phalangeal bone region of interest;
    extracting a plurality of physiological features of said fourth image to acquire a first data;
    extracting a plurality of morphological features of said fourth image to obtain a profile;
    transforming said profile for compressing a second data thereof;
    delivering said first data and said second data to a neural network for training; and
    outputting an assessment.

* * * * *